(12) United States Patent
Srinivasan et al.

(10) Patent No.: US 8,954,055 B2
(45) Date of Patent: Feb. 10, 2015

(54) INITIAL ACQUISITION AND NEIGHBOR SEARCH ALGORITHMS FOR WIRELESS NETWORKS

(71) Applicant: QUALCOMM Incorporated, San Diego, CA (US)

(72) Inventors: Shivratna Giri Srinivasan, San Diego, CA (US); Brian Clarke Banister, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/671,680

(22) Filed: Nov. 8, 2012

(65) Prior Publication Data

US 2013/0122822 A1 May 16, 2013

Related U.S. Application Data

(60) Provisional application No. 61/558,377, filed on Nov. 10, 2011.

(51) Int. Cl.
*H04W 24/00* (2009.01)
*H04J 11/00* (2006.01)
*H04L 27/26* (2006.01)

(52) U.S. Cl.
CPC ......... *H04J 11/0073* (2013.01); *H04J 11/0076* (2013.01); *H04J 11/00* (2013.01); *H04L 27/26* (2013.01); *H04L 27/2657* (2013.01); *H04L 27/2666* (2013.01); *H04L 27/2675* (2013.01)
USPC ............ 455/423; 455/208; 455/265; 455/502

(58) Field of Classification Search
CPC ............ H04B 1/7083; H04L 25/03866; H04L 5/0053; H04L 27/2657; H04L 27/2671; H04L 27/2672; H04L 27/2675; H04L 5/0007; H04L 5/0073; H04W 48/16; H04W 16/12; H04W 48/02; H04W 48/12; H04W 48/20
See application file for complete search history.

(56) References Cited

U.S. PATENT DOCUMENTS

2008/0273522 A1 11/2008 Luo et al.
2009/0046671 A1 2/2009 Luo
(Continued)

OTHER PUBLICATIONS

Bartis, M., et al., "Achieving Secondary Synchronization for downlink in the Long Term Evolution standard", Electronics and Telecommunications (ISETC), 2010 9th International Symposium on, IEEE, Piscataway, NJ, USA, Nov. 11, 2010, pp. 129-132, XP031843021, ISBN: 978-1-4244-8457-7 the whole document.
(Continued)

*Primary Examiner* — Kathy Wang-Hurst
(74) *Attorney, Agent, or Firm* — Patterson & Sheridan, L.L.P.

(57) ABSTRACT

In a wireless network, a base station (BS) may send a primary synchronization signal (PSS) and a secondary synchronization signal (SSS). The synchronization signals may be used by user equipments (UEs) for cell detection and acquisition. A typical searching operation may involve first locating the PSS sequences transmitted by neighboring BSs, followed by SSS detection. Described further herein are algorithms that result in the detection of the PSS and the SSS from a BS. A method for detecting a BS generally includes sampling a received signal from receiver antennas to obtain a sampled sequence, analyzing the sampled sequence to detect a PSS in a current half-frame (HF), calculating signal-to-noise ratio (SNR) metrics based on the detected PSS, combining the calculated SNR metrics with SNR metrics from previous HFs, analyzing the combined SNR metrics to obtain timing information, and analyzing the sampled sequence using the timing information to detect a SSS.

20 Claims, 9 Drawing Sheets

(56) References Cited

U.S. PATENT DOCUMENTS

2010/0069066 A1    3/2010   Shen et al.
2010/0099409 A1*   4/2010   Han et al. .................. 455/434
2011/0103534 A1*   5/2011   Axmon et al. ............... 375/371
2012/0044928 A1    2/2012   Bhattad et al.
2012/0046056 A1    2/2012   Luo et al.

OTHER PUBLICATIONS

International Search Report and Written Opinion—PCT/US2012/064264—ISA/EPO—Apr. 29, 2013.

Li, B., et al., "Efficient SSS Detection for Neighbor Cell Search in 3GPP LTE TDD System", ICC 2011-2011 IEEE International conference on Communication—Jun. 5-9, 2011—Kyoto, Japan, IEEE, Piscataway, NJ, USA, Jun. 5, 2011, pp. 1-5, XP031908262, DOI:10.1109/ICC.2011.5962495, ISBN: 978-1-61284-232-5 the whole document.

Yan, Z., etal., "A Novel Initial Cell Search Scheme in TD-LTE", Vehicular Technology Conference (VTC Spring), 2011 IEEE 73rd, IEEE, May 15, 2011, pp. 1-5, XP031896525, DOI: 10.1109/VETECS.2011.5956122 ISBN: 978-1-4244-8332-7 the whole document.

* cited by examiner

INITIAL ACQUISITION AND NEIGHBOR SEARCH ALGORITHMS FOR WIRELESS NETWORKS

CROSS-REFERENCE TO RELATED APPLICATIONS

This application claims benefit of U.S. Provisional Patent Application Ser. No. 61/558,377, entitled "Initial Acquisition And Neighbor Search Algorithms For Wireless Networks" and filed Nov. 10, 2011, which is herein incorporated by reference.

BACKGROUND

I. Field

Certain aspects of the present disclosure generally relate to wireless communications and, more specifically, to algorithms for initial acquisition of a wireless network and a neighbor search.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communications. The method generally includes sampling a received signal from one or more receiver antennas to obtain a sampled sequence, analyzing the sampled sequence to detect a primary synchronization sequence (PSS) in a current half-frame, calculating SNR metrics based on the detected PSS, combining the calculated SNR metrics with SNR metrics from one or more previous half-frames, analyzing the combined SNR metrics to obtain timing information, and analyzing the sampled sequence using the timing information to detect a secondary synchronization sequence (SSS).

Certain aspects of the present disclosure provide an apparatus for wireless communications. The apparatus generally includes means for sampling a received signal from one or more receiver antennas to obtain a sampled sequence, means for analyzing the sampled sequence to detect a primary synchronization sequence (PSS) in a current half-frame, means for calculating SNR metrics based on the detected PSS, means for combining the calculated SNR metrics with SNR metrics from one or more previous half-frames, means for analyzing the combined SNR metrics to obtain timing information, and means for analyzing the sampled sequence using the timing information to detect a secondary synchronization sequence (SSS).

Certain aspects of the present disclosure provide an apparatus for wireless communications. The apparatus generally includes at least one processor configured to sample a received signal from one or more receiver antennas to obtain a sampled sequence, analyze the sampled sequence to detect a primary synchronization sequence (PSS) in a current half-frame, calculate signal-to-noise ratio (SNR) metrics based on the detected PSS, combine the calculated SNR metrics with SNR metrics based on PSS detected from one or more previous half-frames, analyze the combined SNR metrics to obtain timing information, and analyze the sampled sequence using the timing information to detect a secondary synchronization sequence (SSS); and a memory coupled with the at least one processor.

Certain aspects of the present disclosure provide a computer program product for wireless communications by a user equipment (UE), comprising a computer readable medium having instructions stored thereon. The instructions are generally executable by one or more processors for sampling a received signal from one or more receiver antennas to obtain a sampled sequence, analyzing the sampled sequence to detect a primary synchronization sequence (PSS) in a current half-frame, calculating signal-to-noise ratio (SNR) metrics based on the detected PSS, combining the calculated SNR metrics with SNR metrics based on PSS detected from one or more previous half-frames, analyzing the combined SNR metrics to obtain timing information, and analyzing the sampled sequence using the timing information to detect a secondary synchronization sequence (SSS).

DETAILED DESCRIPTION

In a wireless network, a base station (BS) may send a primary synchronization signal (PSS) and a secondary synchronization signal (SSS). The synchronization signals may be used by user equipments (UEs) for cell detection and acquisition. A typical searching operation may involve first locating the PSS sequences transmitted by neighboring BSs, followed by SSS detection. Described further herein are algorithms that result in the detection of the PSS and the SSS from a BS.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
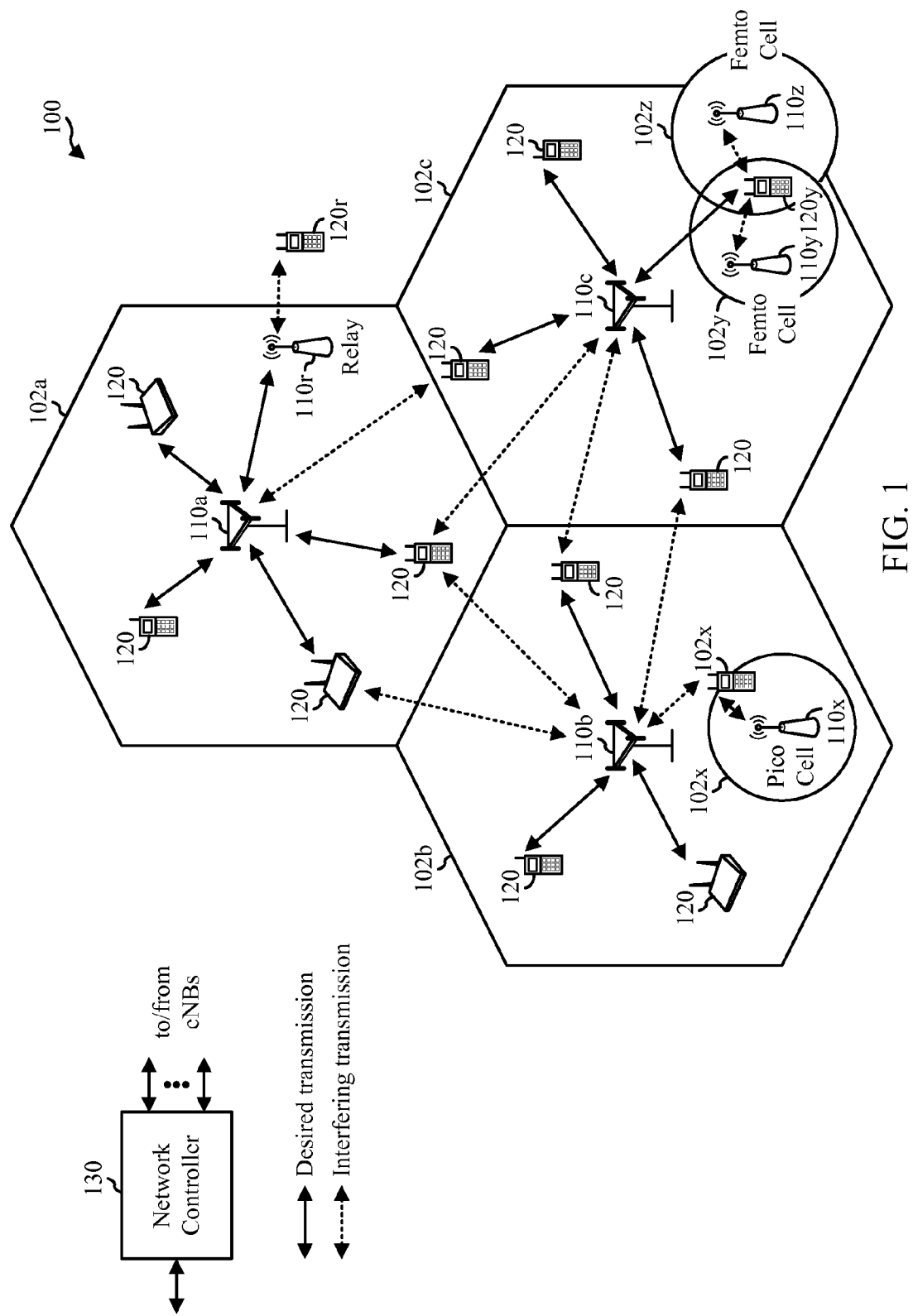
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
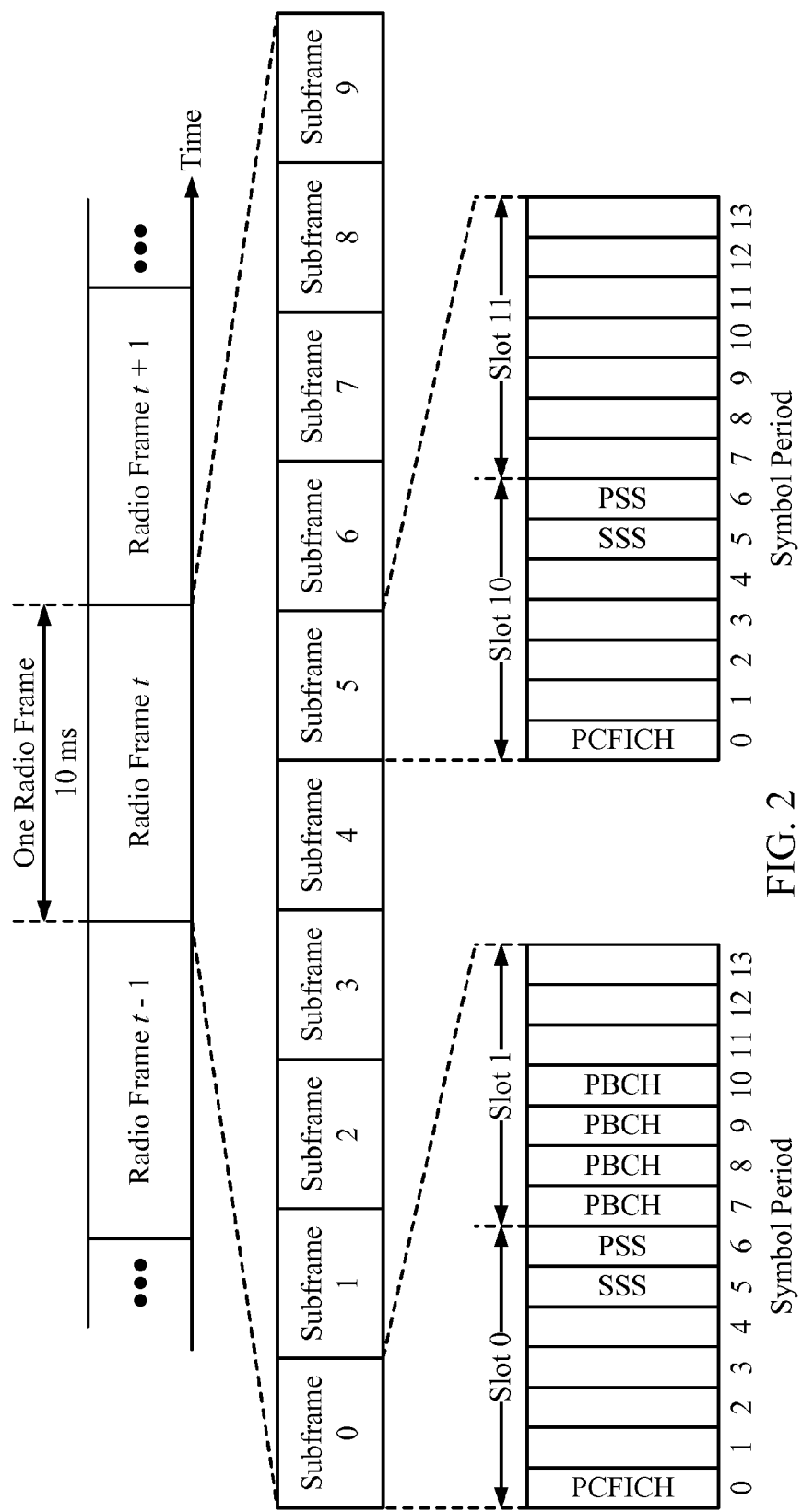
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
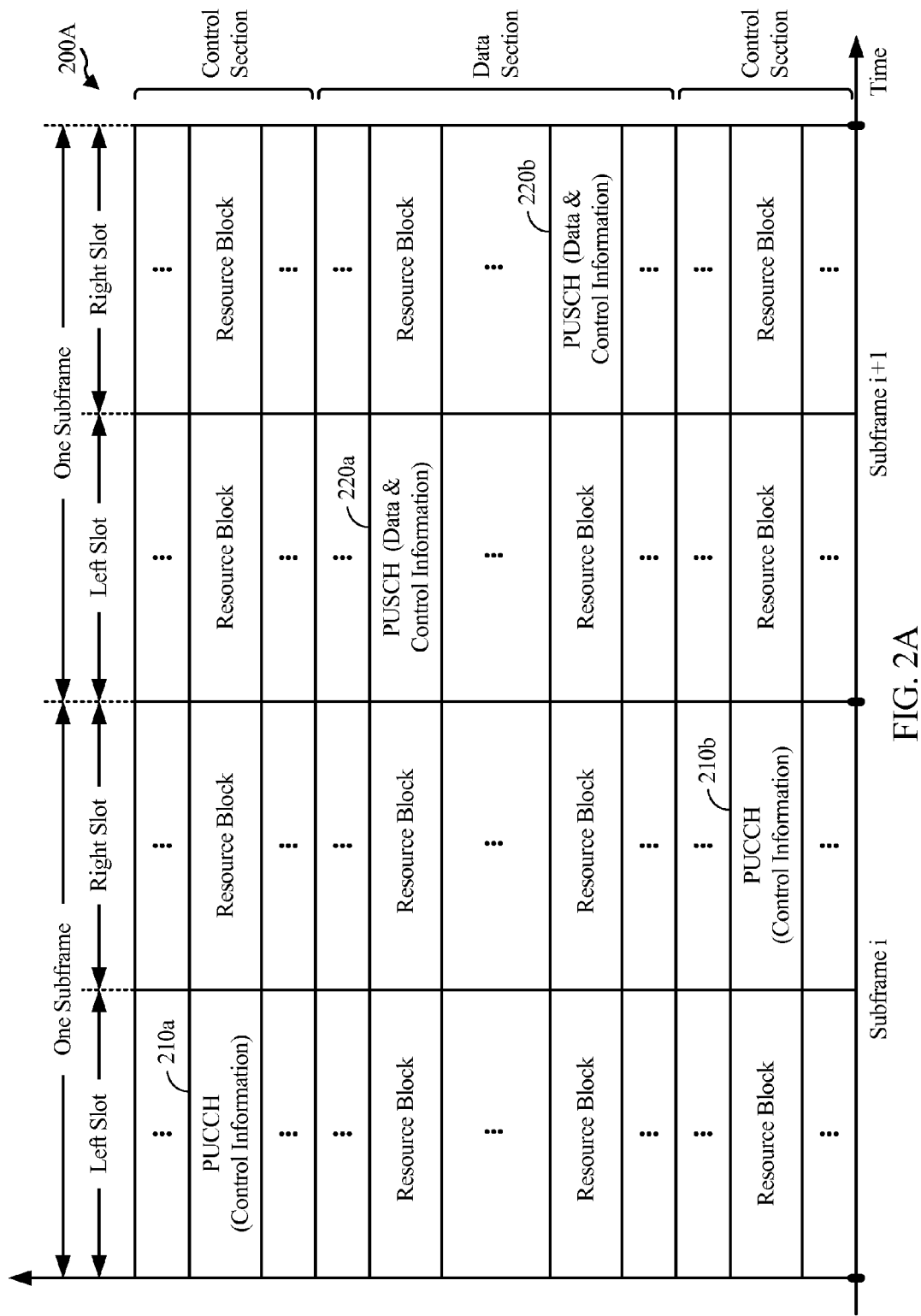
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110*b*. This may result in less interference to the wireless network for a given data rate for UE 120*x*.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
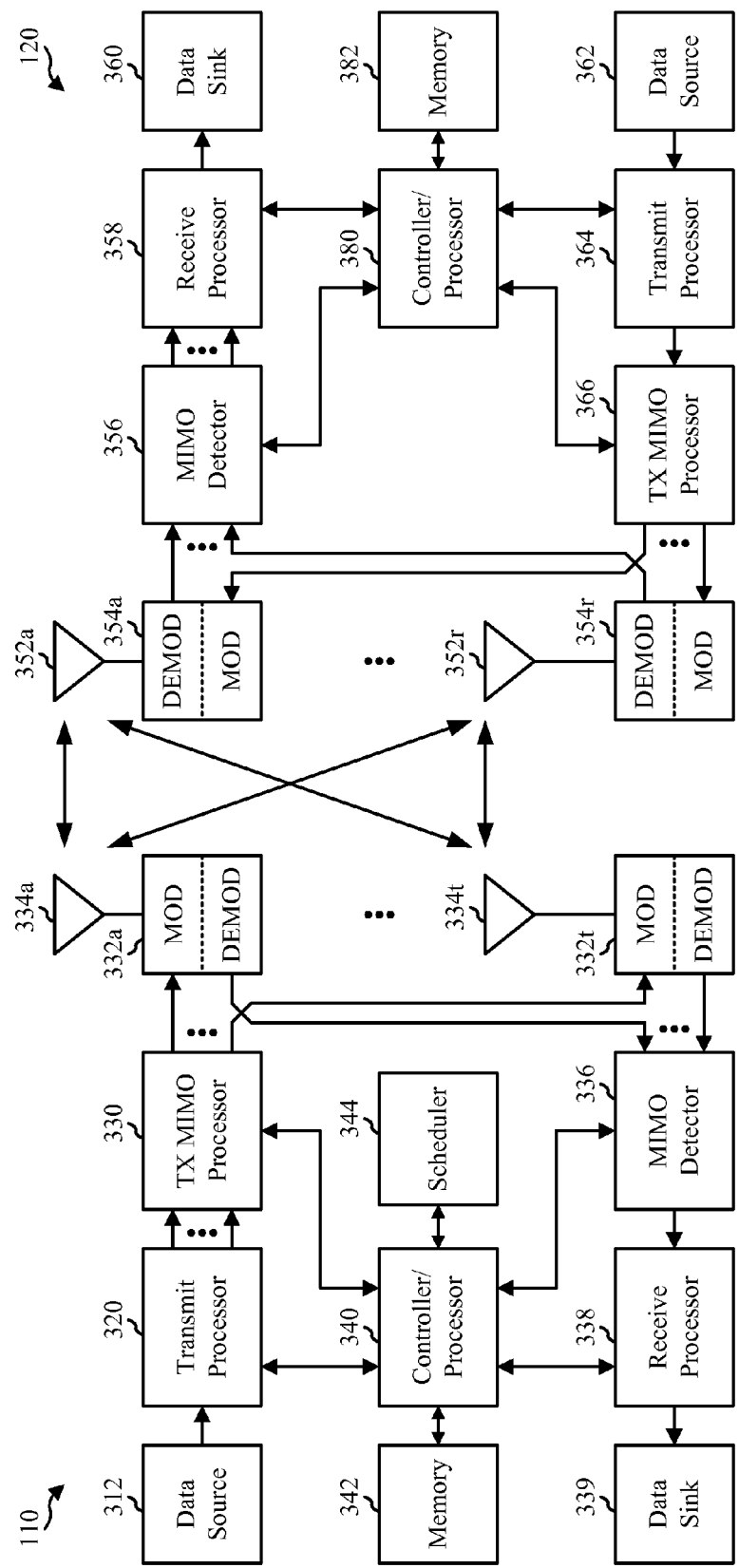
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110*c* in FIG. 1, and UE 120 may be UE 120*y*. The eNB 110 may also be a base station of some other type. The eNB 110 may be equipped with T antennas 334*a* through 334*t*, and the UE 120 may be equipped with R antennas 352*a* through 352*r*, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332*a* through 332*t* may be transmitted via T antennas 334*a* through 334*t*, respectively.

At the UE 120, antennas 352*a* through 352*r* may receive the downlink signals from the eNB 110 and may provide received signals to demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354*a* through 354*r*, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354*a* through 354*r* (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIG. 7, and/or other processes for the techniques described herein. The memories 342 and 382 may store data and program codes for base station 110 and UE 120, respectively. A scheduler 344 may schedule UEs for data transmission on the downlink and/or uplink.

In LTE, cell identities range from 0 to 503. Synchronization signals are transmitted in the center 62 resource elements (REs) around the DC tone to help detect cells. The synchronization signals comprise two parts: a Primary Synchronization Signal (PSS) and a Secondary Synchronization Signal (SSS).

Figure 4:
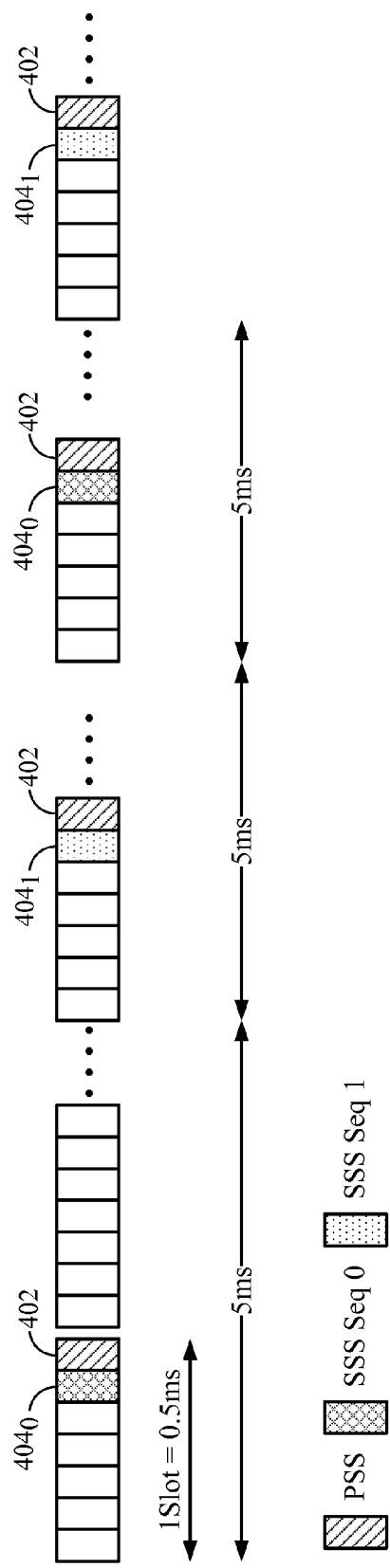
FIG. 4 illustrates an example Primary Synchronization Signal (PSS) sequence and alternating Secondary Synchronization Signal (SSS) sequences with a periodicity of 5 ms, in accordance with certain aspects of the present disclosure.

FIG. 4 illustrates an example PSS sequence 402 and alternating SSS sequences 404$_0$, 404$_1$ with a periodicity of 5 ms, in accordance with certain aspects of the present disclosure. The PSS allows a UE to obtain frame timing modulo 5 ms and part of the physical layer cell identifier (cell ID), and specifically cell id modulo 3. Three different PSS sequences exist with each sequence mapping to a disjoint group of 168 cell IDs. Based on Zadoff-Chu (ZC) sequences, the PSS sequence is chosen from one of 3 sequences based on a PSS Index=Cell ID modulo 3. The same sequence is transmitted every 5 ms as shown in FIG. 4.

The SSS is used by the UE to detect the LTE frame timing modulo 10 ms and to obtain the cell ID. The SSS is transmitted twice in each 10 ms radio frame as depicted in FIG. 4. The SSS sequences are based on maximum length sequences, known as M-sequences, and each SSS sequence is constructed by interleaving, in the frequency-domain, two length-31 Binary Phase Shift Keying (BPSK)-modulated sequences. These two codes are two different cyclic shifts of a single length-31 M-sequence. The cyclic shift indices of the M-sequences are derived from a function of the physical layer cell identity group. The two codes are alternated between the first and second SSS transmissions in each radio frame.

In other words, two sequences for a cell ID that alternate every 5 ms are transmitted. The SSS sequence is obtained by first choosing from a set of 168 different sequences (different sets for subframes 0 and 5) based on an SSS Index (=floor (Cell ID/3)) and then scrambling the chosen sequence using a sequence which is a function of the PSS Index. Hence, while searching for the SSS, if the PSS Index is known, a UE may only need to search up to 168 sequences.

Spacing between the PSS and the SSS helps a UE to distinguish between Extended Cyclic Prefix (CP) and Normal CP modes and between TDD (Time Division Duplex) and FDD (Frequency Division Duplex) modes.

A typical searching operation may involve first locating the PSS sequences transmitted by neighboring eNBs (i.e., determining the timing and the PSS index), followed by SSS detection for the found PSS Index around the determined timing.

Both PSS and SSS detection may involve using samples over multiple bursts to improve the chances of detection and reduce false detection rates. Using multiple bursts provides time diversity. Spacing the bursts far apart improves the time diversity, but increases the time taken for detection.

Initial Acquisition and Neighbor Search Algorithms for Wireless Networks

Embodiments of the present disclosure provide techniques for detecting the physical layer cell ID of a base station of a wireless network (e.g., eNB of an LTE network) by using synchronization signals provided by the eNB (e.g., PSS and SSS). Described further herein are modem baseband algorithms that result in the detection of the PSS and the SSS from an eNB.

For the initial acquisition of an eNB, embodiments of the present disclosure provide techniques for finding an LTE signal with a certain center-frequency in a band of interest. The UE may detect at least the following unknowns during initial acquisition: frame timing, physical layer ID, cell ID group, and the cyclic prefix (CP) length used in the frame. To facilitate detection and estimation of the above quantities, the UE may use two synchronization signals, the PSS and the SSS, which may be transmitted by an eNB every 5 ms, as described above.

Figure 5:
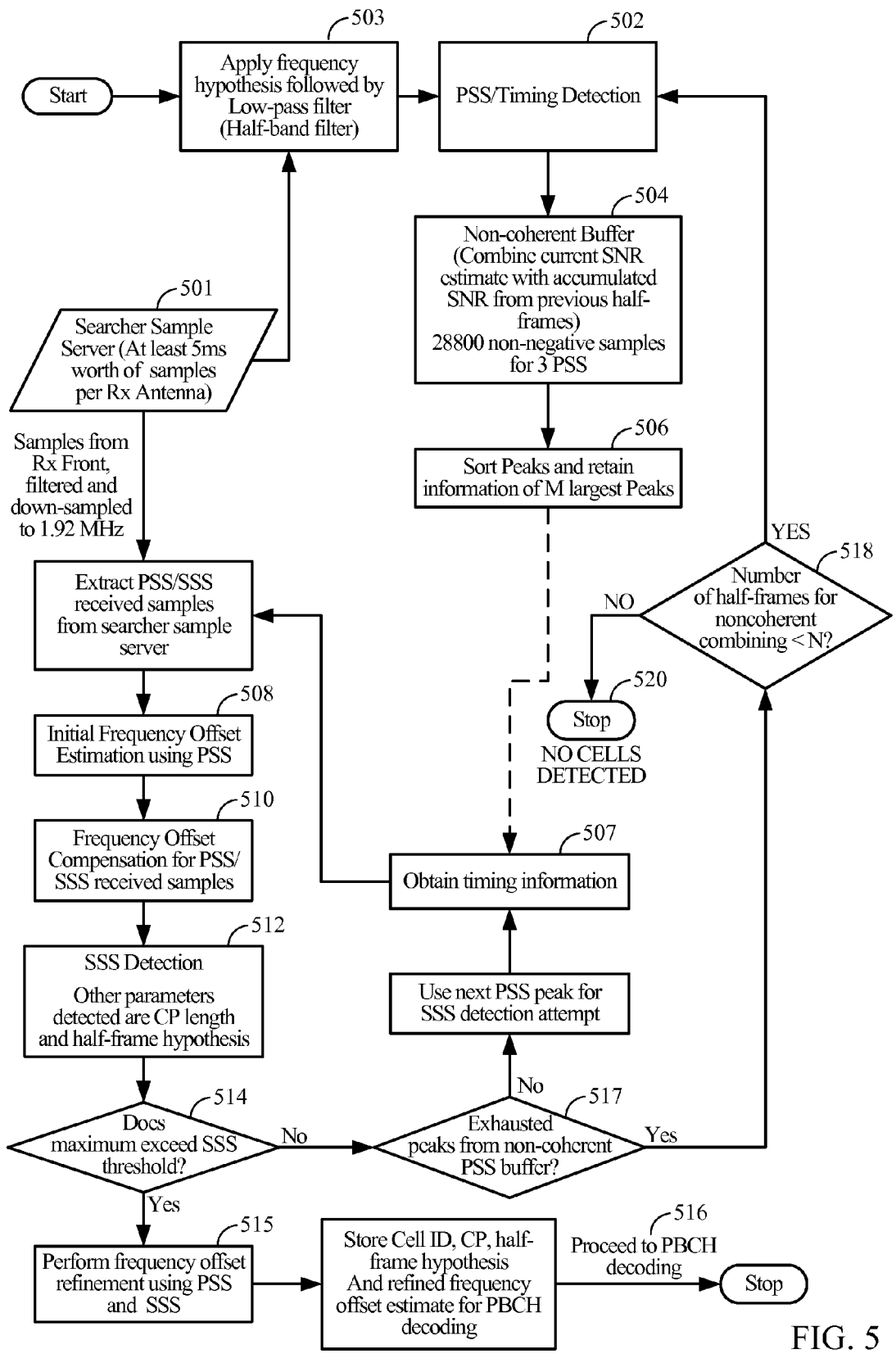
FIG. 5 illustrates an algorithm that a UE may follow for the initial acquisition of a wireless network, in accordance with certain aspects of the present disclosure.

FIG. 5 illustrates an algorithm that a UE may follow for the initial acquisition of a cell in a wireless network, in accordance with certain aspects of the present disclosure. Initially, at 501, the UE may sample a received signal from one or more receiver antennas to obtain a sampled sequence (e.g., at least 5 ms worth of samples per receiver antenna, or samples downsampled to 1.92 MHz). The UE may store complex input samples in a buffer of at least 9600 samples. At 502, the UE may perform PSS detection in a current half-frame (HF) by generating detection metrics based on the three reference PSS sequences and all 9600 timing hypotheses. For some embodiments, at 503, a number of frequency hypotheses (e.g., phase ramp or rotation in time) may be applied to the signal prior to the PSS detection, in an effort to avoid the risk of not being able to detect signals having a low SNR. PSS correlation may be performed on each hypothesis, and timing detection may be performed on the hypothesis with a better metric.

At 504, the UE may calculate SNR metrics based on the detected PSS and noncoherently combine the calculated SNR metrics with SNR metrics from one or more previous HFs (e.g., to improve reliability). At 506, after each half-frame of combining, the UE may sort the PSS from HFs in descending order of PSS SNRs and pick the top M peaks. At 507, the UE may analyze the combined SNR metrics to obtain timing information. After each half-frame (e.g., 5 ms), the UE may perform the following steps for each of the M candidates: frequency offset estimation based on PSS (at 508); frequency compensation of samples based on the frequency offset estimate (at 510); and SSS detection (at 512).

As illustrated, the UE may estimate a frequency offset by evaluating SNR metrics based on the detected PSS, and perform frequency compensation of the sampled sequence based on the estimated frequency offset. Therefore, the frequency may be compensated prior to SSS detection. The UE may perform SSS detection every half-frame by analyzing the sample sequence (or the frequency-compensated sampled sequence) using the timing information, with the union of cells detected across half-frames taken at the end (e.g., to improve reliability). At 514, if at any point, the SSS detection SNR metric exceeds a threshold, the cell ID, its CP, and timing may be considered as detected, and PBCH decoding may be attempted on this candidate (at 516). For some embodiments, prior to PBCH decoding, a joint frequency offset may be calculated (at 515) by evaluating SNR metrics based on the detected PSS and the detected SSS.

However, if the SSS detection does not yield any candidates (e.g., the SSS detection SNR metric does not exceed the threshold), the UE may determine whether there are any remaining candidates from the M candidates (at 517) and continue the above-described algorithm. After exhausting the M candidates, if the SSS detection does not yield any candidates, the UE may continue the above-described algorithm until N HFs of PSS SNR metric noncoherent combining are exhausted (at 518). If no cell is found after all the above SSS detection attempts, the UE may determine that there is no cell present on the carrier frequency (at 520).

After a successful initial acquisition, the UE may be camped on an LTE cell (i.e., serving cell). For a neighbor search, embodiments of the present disclosure provide techniques for finding an LTE cell, different from the cell on which the UE is camped on, so that the UE may monitor the measurements of different cells in the vicinity.

Figure 6:
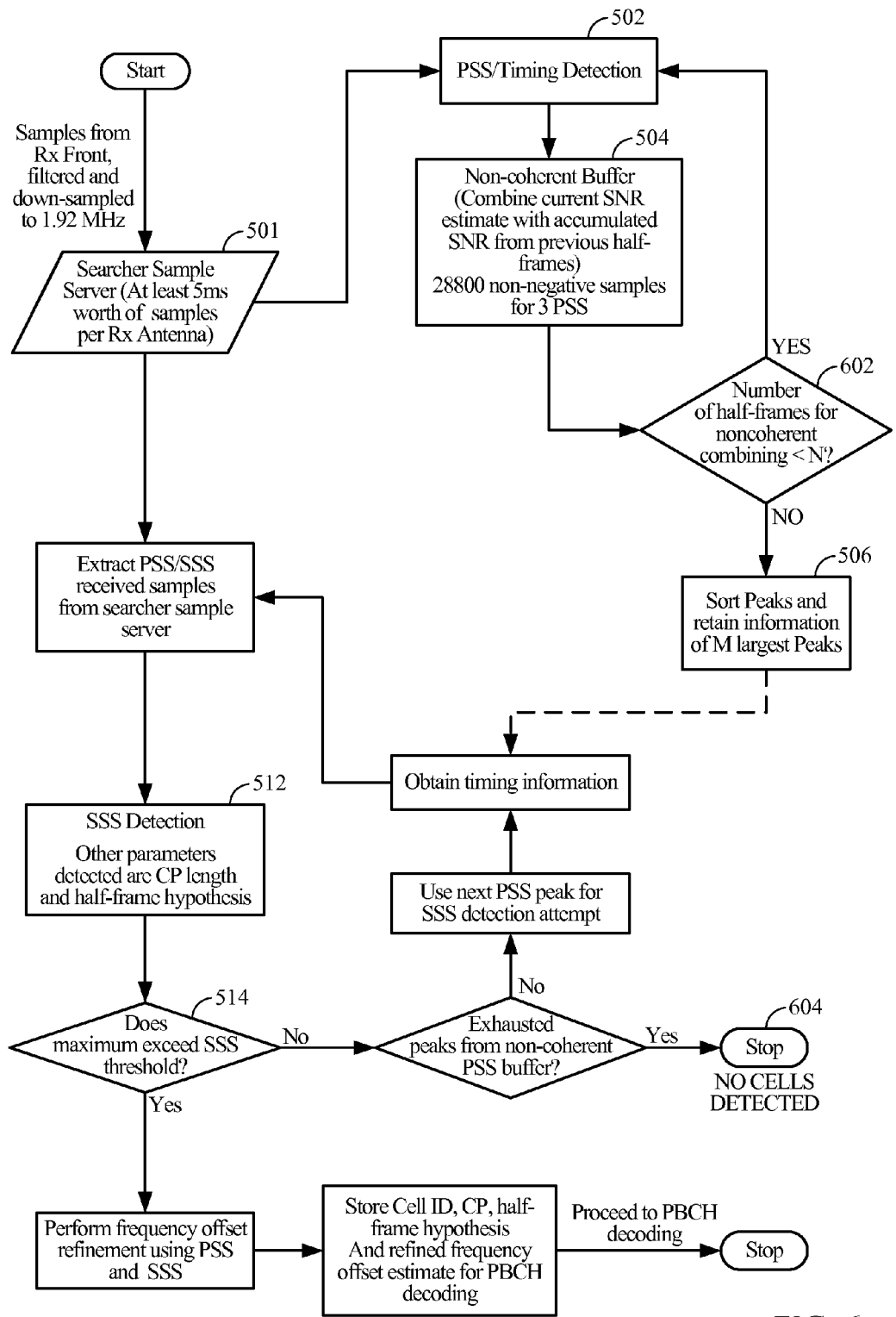
FIG. 6 illustrates an algorithm that a UE may follow for performing a neighboring cell search, in accordance with certain aspects of the present disclosure.

FIG. 6 illustrates an algorithm that a UE may follow for performing a neighboring cell search, in accordance with certain aspects of the present disclosure. Initially, at 501, the UE may sample a received signal from one or more receiver antennas to obtain a sampled sequence (e.g., at least 5 ms worth of samples per receiver antenna, or samples downsampled to 1.92 MHz). The UE may store complex input samples in a buffer of at least 9600 samples. At 502, the UE may perform PSS detection in a current HF by generating detection metrics based on the three reference PSS sequences and all 9600 timing hypotheses. At 504, the UE may calculate SNR metrics based on the detected PSS and noncoherently combine the calculated SNR metrics with SNR metrics from one or more previous HFs. For some embodiments, SSS detection may occur every HF, similar to the initial acquisition algorithm illustrated in FIG. 5.

For some embodiments, after N HFs are noncoherently combined (verified at 602), SSS detection may be attempted on the candidate peaks, as described above. For example, the UE may sort the PSS from HFs in descending order of PSS SNRs and pick the top M peaks (at 506), and perform SSS detection on each of the M candidates (at 512). At 514, if at any point, the SSS detection SNR metric exceeds a threshold, the cell ID, its CP, and timing may be considered as detected. However, if SSS detection does not yield any candidates after the M SSS detection attempts, then the UE may determine that there is no cell present on that carrier frequency (at 604).

Figure 7:
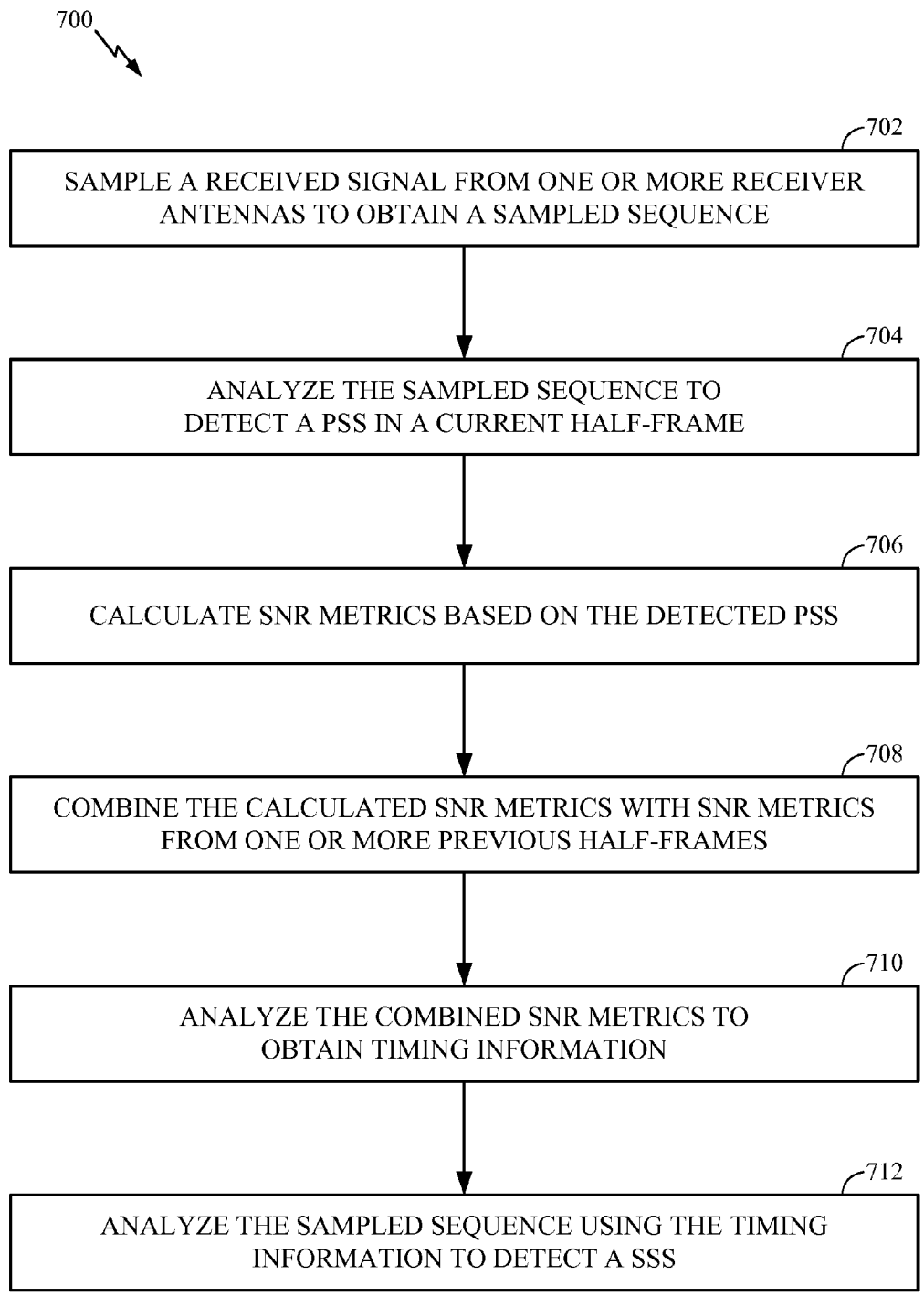
FIG. 7 illustrates example operations for detecting a base station of a wireless network, in accordance with certain aspects of the present disclosure.

FIG. 7 illustrates example operations 700 for detecting a base station of a wireless network, in accordance with certain aspects of the present disclosure. The operations 700 may be performed, for example, by a UE. Detecting the base station may be for initial acquisition of the base station or while performing a neighbor search. At 702, the UE may sample a received signal from one or more receiver antennas to obtain a sampled sequence. For example, the UE may sample at least 5 ms worth of samples per receiver antenna, or samples downsampled to 1.92 MHz.

At 704, the UE may analyze the sampled sequence to detect a PSS in a current half-frame. At 706, the UE may calculate SNR metrics based on the detected PSS. At 708, the UE may combine the calculated SNR metrics with SNR metrics from one or more previous half-frames. For example, the UE may noncoherently combine the calculated SNR metrics with the SNR metrics from the one or more previous HFs in an effort to improve reliability.

At 710, the UE may analyze the combined SNR metrics to obtain timing information. For certain aspects, analyzing the combined SNR metrics includes sorting the calculated SNR metrics and the SNR metrics based on the PSS detected from the one or more previous half-frames, retaining one or more of the largest SNR metrics based on the sorting, and analyzing a first one of the largest SNR metrics to obtain the timing information.

At 712, the UE may analyze the sampled sequence using the timing information to detect a SSS. For certain aspects, the UE may estimate a frequency offset by evaluating the first one of the largest SNR metrics and, prior to detecting the SSS, the UE may perform frequency compensation of the sampled sequence based on the estimated frequency offset.

For certain aspects, the UE may calculate SNR metrics based on the detected SSS and compare the SNR metrics based on the detected SSS with a threshold value. If the SNR metrics based on the detected SSS is less than the threshold value, the UE may detect the SSS based on a second one of the largest SNR metrics based on the PSS detected from the one or more previous half-frames.

Upon detecting the SSS, the UE may calculate a joint frequency offset by evaluating SNR metrics based on the detected PSS and the detected SSS. For certain aspects, the SSS detection may occur every half-frame. For certain aspects, the SSS detection may occur at an end of combining SNR metrics based on PSS for one or more half-frames.

Figure 7A:
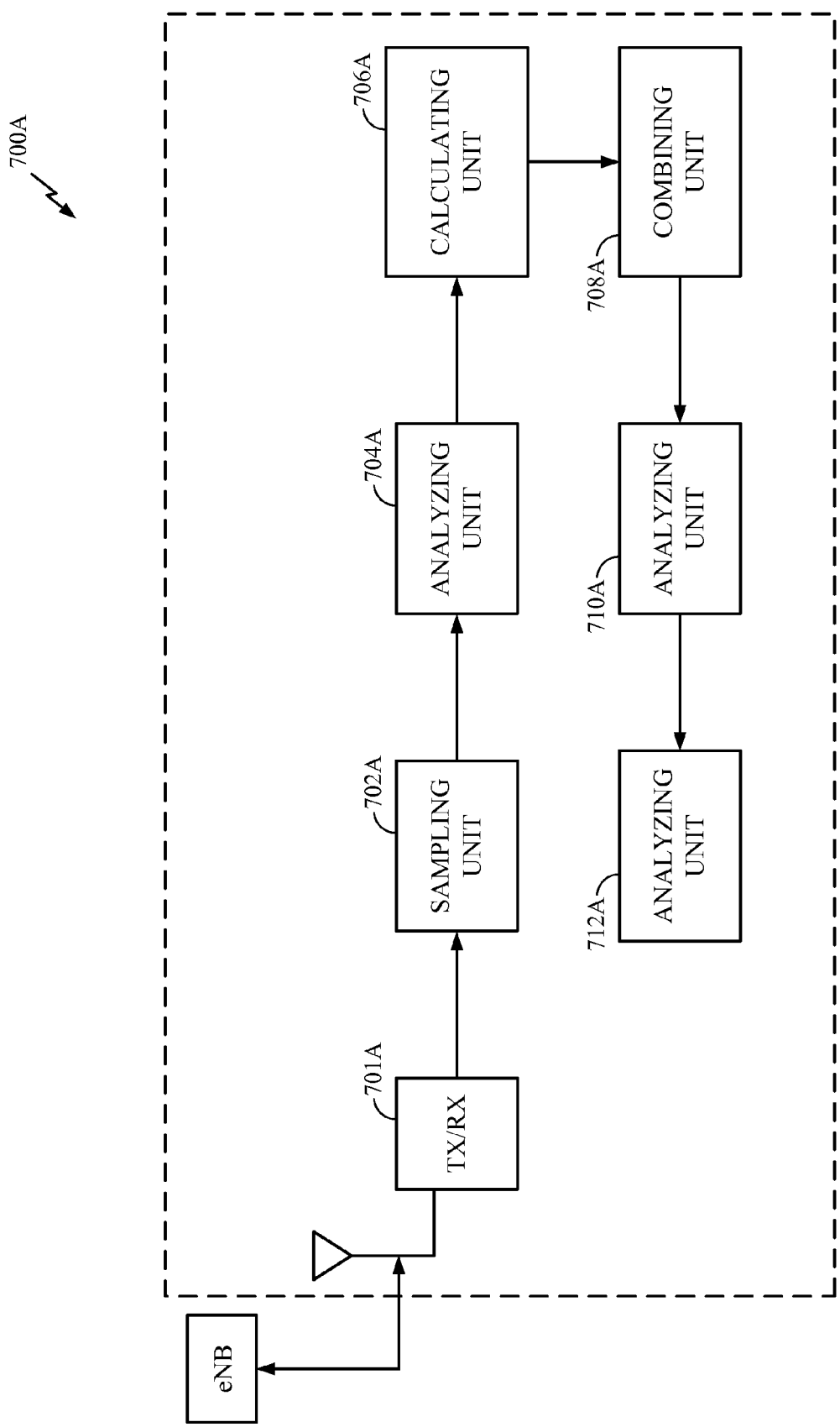
FIG. 7A illustrates example components capable of performing the operations illustrated in FIG. 7.

The operations 700 described above may be performed by any suitable components or other means capable of performing the corresponding functions of FIG. 7. For example, operations 700 illustrated in FIG. 7 correspond to components 700A illustrated in FIG. 7A. In FIG. 7A, a transceiver (TX/RX) 701A may receive a signal at one or more receiver antennas. A sampling unit 702A may sample the received signal to obtain a sampled sequence. An analyzing unit 704A may analyze the sampled sequence to detect a PSS in a current half-frame. A calculating unit 706A may calculate SNR metrics based on the detected PSS. A combining unit 708A may combine the calculated SNR metrics with SNR metrics from one or more previous half-frames. An analyzing unit 710A may analyze the combined SNR metrics to obtain timing information. An analyzing unit 712A may analyze the sampled sequence using the timing information to detect a SSS.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for transmitting or means for sending may comprise a transmitter, a modulator 354, and/or an antenna 352 of the UE 120 depicted in FIG. 3 or a transmitter, a modulator 332, and/or an antenna 334 of the eNB 110 shown in FIG. 3. Means for receiving may comprise a receiver, a demodulator 354, and/or an antenna 352 of the UE 120 depicted in FIG. 3 or a receiver, a demodulator 332, and/or an antenna 334 of the eNB 110 shown in FIG. 3. Means for processing, means for determining, means for sampling, and/or means for cancelling out may comprise a processing system, which may include at least one processor, such as the transmit processor 320, the receive processor 338, or the controller/processor 340 of the eNB 110 or the receive processor 358, the transmit processor 364, or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE), comprising:
    sampling a received signal from one or more receiver antennas to obtain a sampled sequence;
    analyzing the sampled sequence to detect a primary synchronization sequence (PSS) in a current half-frame;
    calculating signal-to-noise ratio (SNR) metrics based on the detected PSS;
    combining the calculated SNR metrics with SNR metrics based on a PSS detected from one or more previous half-frames;
    analyzing the combined SNR metrics to obtain timing information; and
    analyzing the sampled sequence using the timing information to detect a secondary synchronization sequence (SSS).

2. The method of claim 1, wherein the SSS detection occurs every half-frame.

3. The method of claim 1, wherein the SSS detection occurs at an end of combining SNR metrics based on the PSS detected for the one or more previous half-frames.

4. The method of claim 3, wherein the PSS detection and the SSS detection is for identifying LTE cells neighboring a serving cell.

5. The method of claim 1, further comprising:
    calculating a joint frequency offset by evaluating SNR metrics based on the detected PSS and the detected SSS.

6. The method of claim 1, wherein analyzing the combined SNR metrics comprises:
    sorting the calculated SNR metrics and the SNR metrics based on the PSS detected from the one or more previous half-frames;
    retaining one or more of the largest SNR metrics based on the sorting; and
    analyzing a first one of the largest SNR metrics to obtain the timing information.

7. The method of claim 6, further comprising:
    estimating a frequency offset by evaluating the first one of the largest SNR metrics; and
    prior to detecting the SSS, performing frequency compensation of the sampled sequence based on the estimated frequency offset.

8. The method of claim 6, further comprising:
    calculating SNR metrics based on the detected SSS; and
    comparing the SNR metrics based on the detected SSS with a threshold value.

9. The method of claim 8, wherein if the SNR metrics based on the detected SSS is less than the threshold value, further comprising:
    detecting the SSS based on other sorted PSS SNR metrics obtained from one or more previous half-frames.

10. An apparatus for wireless communications by a user equipment (UE), comprising:
    means for sampling a received signal from one or more receiver antennas to obtain a sampled sequence;
    means for analyzing the sampled sequence to detect a primary synchronization sequence (PSS) in a current half-frame;
    means for calculating signal-to-noise ratio (SNR) metrics based on the detected PSS;
    means for combining the calculated SNR metrics with SNR metrics based on a PSS detected from one or more previous half-frames;
    means for analyzing the combined SNR metrics to obtain timing information; and
    means for analyzing the sampled sequence using the timing information to detect a secondary synchronization sequence (SSS).

11. The apparatus of claim 10, wherein the SSS detection occurs every half-frame.

12. The apparatus of claim 10, wherein the SSS detection occurs at an end of combining SNR metrics based on the PSS detected for the one or more previous half-frames.

13. The apparatus of claim 12, wherein the PSS detection and the SSS detection is for identifying LTE cells neighboring a serving cell.

14. The apparatus of claim 10, further comprising:
    means for calculating a joint frequency offset by evaluating SNR metrics based on the detected PSS and the detected SSS.

15. The apparatus of claim 10, wherein means for analyzing the combined SNR metrics comprises:
    means for sorting the calculated SNR metrics and the SNR metrics based on the PSS detected from the one or more previous half-frames;
    means for retaining one or more of the largest SNR metrics based on the sorting; and
    means for analyzing a first one of the largest SNR metrics to obtain the timing information.

16. The apparatus of claim 15, further comprising:
    means for estimating a frequency offset by evaluating the first one of the largest SNR metrics; and
    means for performing frequency compensation of the sampled sequence based on the estimated frequency offset prior to detecting the SSS.

17. The apparatus of claim 15, further comprising:
    means for calculating SNR metrics based on the detected SSS; and
    means for comparing the SNR metrics based on the detected SSS with a threshold value.

18. The apparatus of claim 17, further comprising:
means for detecting the SSS based on other sorted PSS SNR metrics obtained from one or more previous half-frames if the SNR metrics based on the detected SSS is less than the threshold value.

19. An apparatus for wireless communications by a user equipment (UE), comprising:
at least one processor configured to sample a received signal from one or more receiver antennas to obtain a sampled sequence, analyze the sampled sequence to detect a primary synchronization sequence (PSS) in a current half-frame, calculate signal-to-noise ratio (SNR) metrics based on the detected PSS, combine the calculated SNR metrics with SNR metrics based on a PSS detected from one or more previous half-frames, analyze the combined SNR metrics to obtain timing information, and analyze the sampled sequence using the timing information to detect a secondary synchronization sequence (SSS); and
a memory coupled with the at least one processor.

20. A computer program product for wireless communications by a user equipment (UE), comprising a non-transitory computer readable medium having instructions stored thereon, the instructions executable by one or more processors for:
sampling a received signal from one or more receiver antennas to obtain a sampled sequence;
analyzing the sampled sequence to detect a primary synchronization sequence (PSS) in a current half-frame;
calculating signal-to-noise ratio (SNR) metrics based on the detected PSS;
combining the calculated SNR metrics with SNR metrics based on a PSS detected from one or more previous half-frames;
analyzing the combined SNR metrics to obtain timing information; and
analyzing the sampled sequence using the timing information to detect a secondary synchronization sequence (SSS).

* * * * *